United States Patent
Lee

(10) Patent No.: US 6,196,077 B1
(45) Date of Patent: Mar. 6, 2001

(54) AUTOMATIC SHIFT CONTROL DEVICE FOR ELECTRONIC PNEUMATIC SHIFT SYSTEM AND METHOD FOR CONTROLLING SAME

(75) Inventor: Won-Hee Lee, Kyungki-do (KR)

(73) Assignee: Hyundai Motor Co., Seoul (KR)

( * ) Notice: Subject to any disclaimer, the term of this patent is extended or adjusted under 35 U.S.C. 154(b) by 0 days.

(21) Appl. No.: 09/465,784

(22) Filed: Dec. 17, 1999

(30) Foreign Application Priority Data

May 10, 1999 (KR) .................................... 99-16545

(51) Int. Cl.$^7$ .................................................. F16H 59/00
(52) U.S. Cl. ..................................................... 74/335
(58) Field of Search ..................................... 74/335

(56) References Cited

U.S. PATENT DOCUMENTS 5,038,627 * 8/1991 Schwaigner et al. ................. 74/335
5,969,519 * 10/1999 Steiling et al. ...................... 74/335

* cited by examiner

Primary Examiner—Dirk Wright

(57) ABSTRACT

Disclosed are an automatic shift control device for an electronic pneumatic shift system and a method for controlling the same. The shift control device detects a position of a gearshift lever through a lever position sensor, the lever position sensor outputting signals corresponding to the position of the gearshift lever to an electronic control unit such that the ECU controls a magnetic valve assembly to supply and exhaust air to the shift control device to thereby control a transmission. The shift control device includes a magnet disposed on one end a shift rod of the shift control device; and a linear variable distance transducer provided on an end of the shift control device corresponding to a position of the magnet, the LVDT detecting a change in a magnetic field caused by a movement of the shift rod, and the LVDT outputting signals corresponding to the change in the magnetic field to the ECU. The method includes the steps of detecting a position of the gearshift lever; determining if there is a shift command; establishing a target position for the shift rod of the shift control device if there is a shift command; controlling the magnetic valve assembly to supply air to the shift control device; detecting a position of the shift rod; determining if the shift rod has come within 90% of the target position; calculating a present position, movement speed and acceleration of the shift rod if the shift rod has come within 90% of the target position; supplying air continuously and suitably to the shift control device until a target shift mode has been obtained; and determining if the target shift mode has been reached.

5 Claims, 3 Drawing Sheets

AUTOMATIC SHIFT CONTROL DEVICE FOR ELECTRONIC PNEUMATIC SHIFT SYSTEM AND METHOD FOR CONTROLLING SAME

BACKGROUND OF THE INVENTION (a) Field of the Invention

The present invention relates to an automatic shift control device for an electronic pneumatic shift system and a method for controlling the same. More particularly, the present invention relates to an automatic shift control device for an electronic pneumatic shift system and a method for controlling the same in which a linear variable distance transducer (LVDT) is used to reduce shift shock.

(b) Description of the Related Art

In trucks, buses and other such vehicles in which an engine is provided at a rear of the vehicle, since a transmission is positioned at a substantial distance from the driver, it is necessary that there is provided a shift device which precisely, smoothly and easily conveys the operation of a clutch and a gearshift lever by the driver to the transmission. A pneumatic shift system is often used instead of the conventional hydraulic or mechanical shift system. In the pneumatic shift system, air pressure is electronically controlled to ultimately change shift modes of the transmission.

FIG. 1 shows a schematic diagram of a general electronic pneumatic shift system to which the present invention is applied.

In the general electronic pneumatic shift system, a lever position sensor 6 detects an operation of a gearshift lever 4L by the driver. The lever position sensor 6 outputs electrical signals corresponding to a changing position of the shift lever 4L to an electronic control unit (ECU) 8, and the ECU 8 outputs signals to control opened and closed states of a magnetic valve assembly 10 according to the signals received from the lever position sensor 6. Accordingly, air is supplied to or exhausted from a shift control device 12 to control a transmission 14 into various forward and reverse shift modes.

The magnetic valve assembly 10 is connected to an air tank 15 and receives the supply of air from the air tank 15. Also, by the supply and exhaust of air from and to the air tank 15 via a reaction valve 18, which is a 3-way magnetic valve connected to a reaction cylinder (not shown), a shift feeling is provided to the driver when the gearshift lever 4L is manipulated to different shift modes.

The ECU 8 is connected to a shift mode display 20, and the ECU 8 performs control such that the shift mode display 20 displays the present shift mode after receiving signals from the lever position sensor 6. The ECU 8 is also connected to a warning lamp 24 which alerts the driver either of either shift failure caused by the incorrect supply of air to the magnetic valve assembly 10, or of the mis-operation of the gearshift lever 4L by the driver. The ECU 8 detects such problems through its connection with a shift mode sensor 22.

The shift control device 12 includes a cylinder MVA 26 and a cylinder MVB 28. Air is supplied to and exhausted from the cylinder MVA 26 and the cylinder MVB 28 by the operation of the magnetic valve assembly 10 which operates according to signals output from the ECU 8. A shift rod 30 is slidably disposed in the shift control device 12. The shift rod 30 is displaced in a rightward or leftward direction (in the drawing) according to the supply of air to the cylinder MVA 26 and the cylinder MVB 28.

A striker 32 is fixedly disposed on the shift rod 30. With this configuration, when the shift rod 30 is displaced in the leftward direction, the striker 32 is also moved such that it operates the transmission 14 to either a first, third or fifth speed of a drive D range; and when the shift rod 30 is displaced in the rightward direction, the striker is moved such that it operates the transmission 14 to either a second or fourth speed of the drive D range, or into reverse. That is, when the driver operates the gearshift lever 4L to different shift modes, the ECU 8 controls the magnetic valve assembly 10 so that air is supplied to or exhausted from the cylinder MVA 26 and the cylinder MVB 28 of the shift control device 12, thereby controlling the displacement of the shift rod 30 and the striker 32.

Also, provided on one end of the shift rod 30 is a magnet 34. Magnet sensors 36 are mounted in the shift control device 12 corresponding to a position of the magnet 34. Accordingly, the magnet sensors 36 are able to detect the changing position of the magnet 34 as the shift rod 30 is displaced.

However, in the general pneumatic shift system as described above, since air pressure is used to shift the transmission 14 into different shift modes, in the case where air is abruptly supplied to the shift control device 12, the shift rod 30 and striker 32 are moved at a substantial speed such that abrupt force is applied to a synchronizer, shift fork, etc. of the transmission 14. This results in the wear of the transmission 14, as well as a reduction in shift and ride quality caused by shift shock.

SUMMARY OF THE INVENTION

The present invention has been made in an effort to solve the above problems.

It is an object of the present invention to provide an automatic shift control device for an electronic pneumatic shift system and a method for controlling the same in which a linear variable distance transducer (LVDT) is used to reduce shift shock.

To achieve the above object, the present invention provides an automatic shift control device for an electronic pneumatic shift system and a method for controlling the same. The shift control device detects a position of a gearshift lever through a lever position sensor, the lever position sensor outputting signals corresponding to the position of the gearshift lever to an electronic control unit such that the ECU controls a magnetic valve assembly to supply and exhaust air to the shift control device to thereby control a transmission. The shift control device includes a magnet disposed on one end a shift rod of the shift control device; and a linear variable distance transducer provided on an end of the shift control device corresponding to a position of the magnet, the LVDT detecting a change in a magnetic field caused by a movement of the shift rod, and the LVDT outputting signals corresponding to the change in the magnetic field to the ECU.

The method includes the steps of detecting a position of the gearshift lever; determining if there is a shift command; establishing a target position for the shift rod of the shift control device if there is a shift command; controlling the magnetic valve assembly to supply air to the shift control device; detecting a position of the shift rod; determining if the shift rod has come within 90% of the target position; calculating a present position, movement speed and acceleration of the shift rod if the shift rod has come within 90% of the target position; supplying air continuously and suitably to the shift control device until a target shift mode has been obtained; and determining if the target shift mode has been reached.

According to a feature of the present invention, in the step of determining if there is a shift command, if there is no shift command, the position of the gearshift lever is continuously detected.

According to another feature of the present invention, in the step of determining if the shift rod has come within 90% of the target position, if the shift rod has not come within 90% of the target position, the LVDT determines the position of the shift rod.

According to yet another feature of the present invention, in the step of determining if the target shift mode has been reached, if the target shift mode has not been reached, the present position, movement speed and acceleration of the shift rod are calculated.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
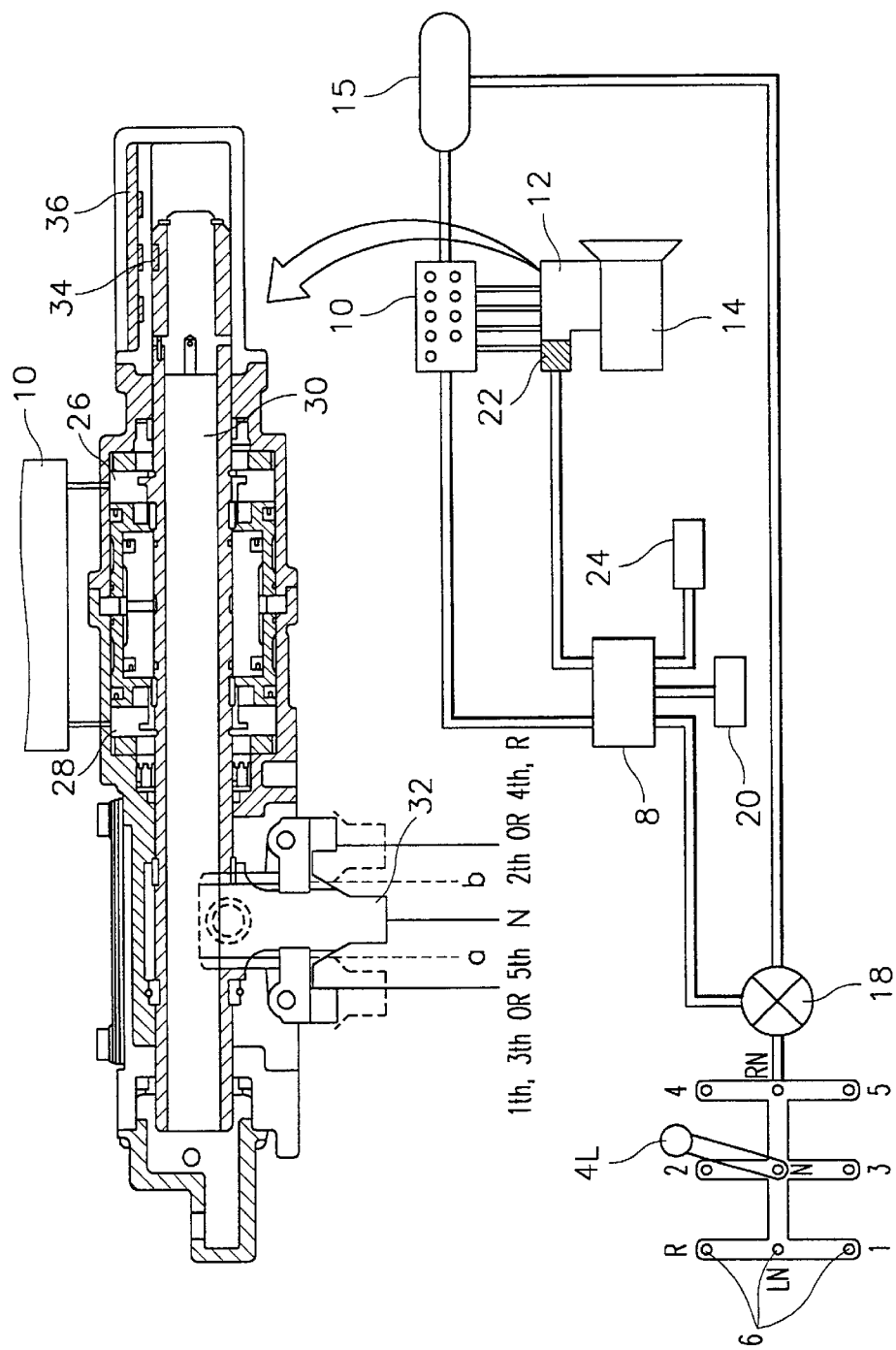
FIG. 1 is a schematic diagram of a general electronic pneumatic shift system to which the present invention is applied.
Figure 2:
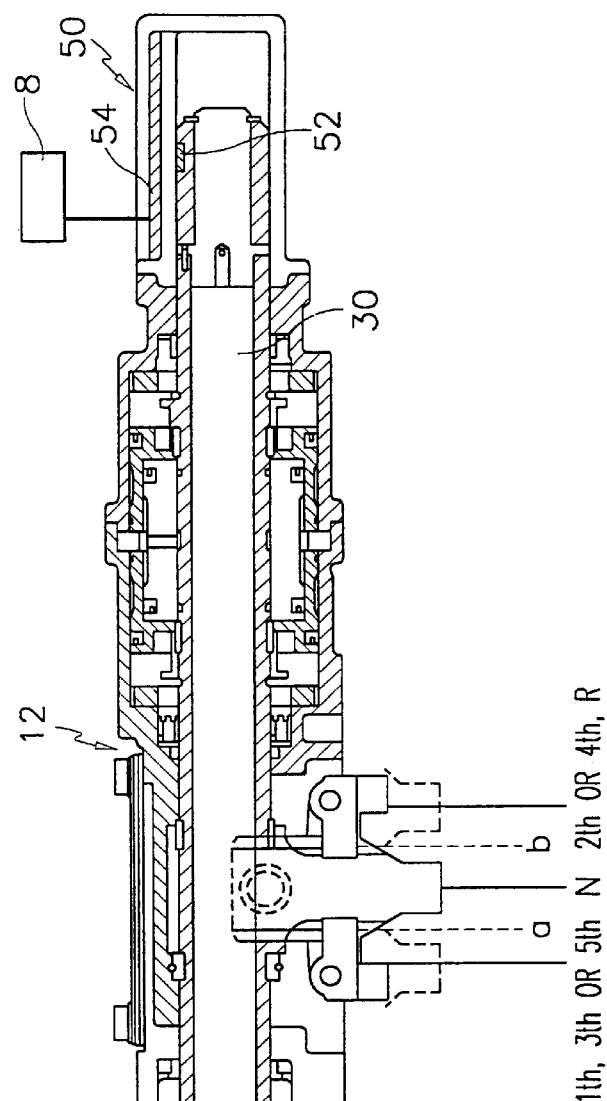
FIG. 2 is a sectional view of a shift control device according to a preferred embodiment of the present invention.

FIG. 1 is a schematic diagram of a general electronic pneumatic shift system to which the present invention is applied; and FIG. 2 is a sectional view of a shift control device according to a preferred embodiment of the present invention. Reference numeral 12 indicates the shift control device.

A shift shock reducing device 50 is provided on one end of the shift control device 12. The shift shock reducing device 50 includes a magnet 52 and a linear variable distance transducer (LVDT) 54. The LVDT 54 is connected to an ECU 8.

The magnet 52 is disposed on one end of an outer circumference of a shift rod 30 of the shift control device 12. The LVDT 54 is a sensor that detects a change in a magnetic field caused by the movement of the magnet 52, the LVDT 54 outputting signals corresponding to the change in the magnetic field. The ECU 8 receives the signals from the LVDT 54 and controls a magnetic valve assembly 10 according to the signals. That is, the ECU 8 controls the magnetic valve assembly 10 on the basis of the signals received from the LVDT 54 such that the supply of air to a cylinder MVA 26 and a cylinder MVB 28 of the shift control device 12 is controlled.

Figure 3:
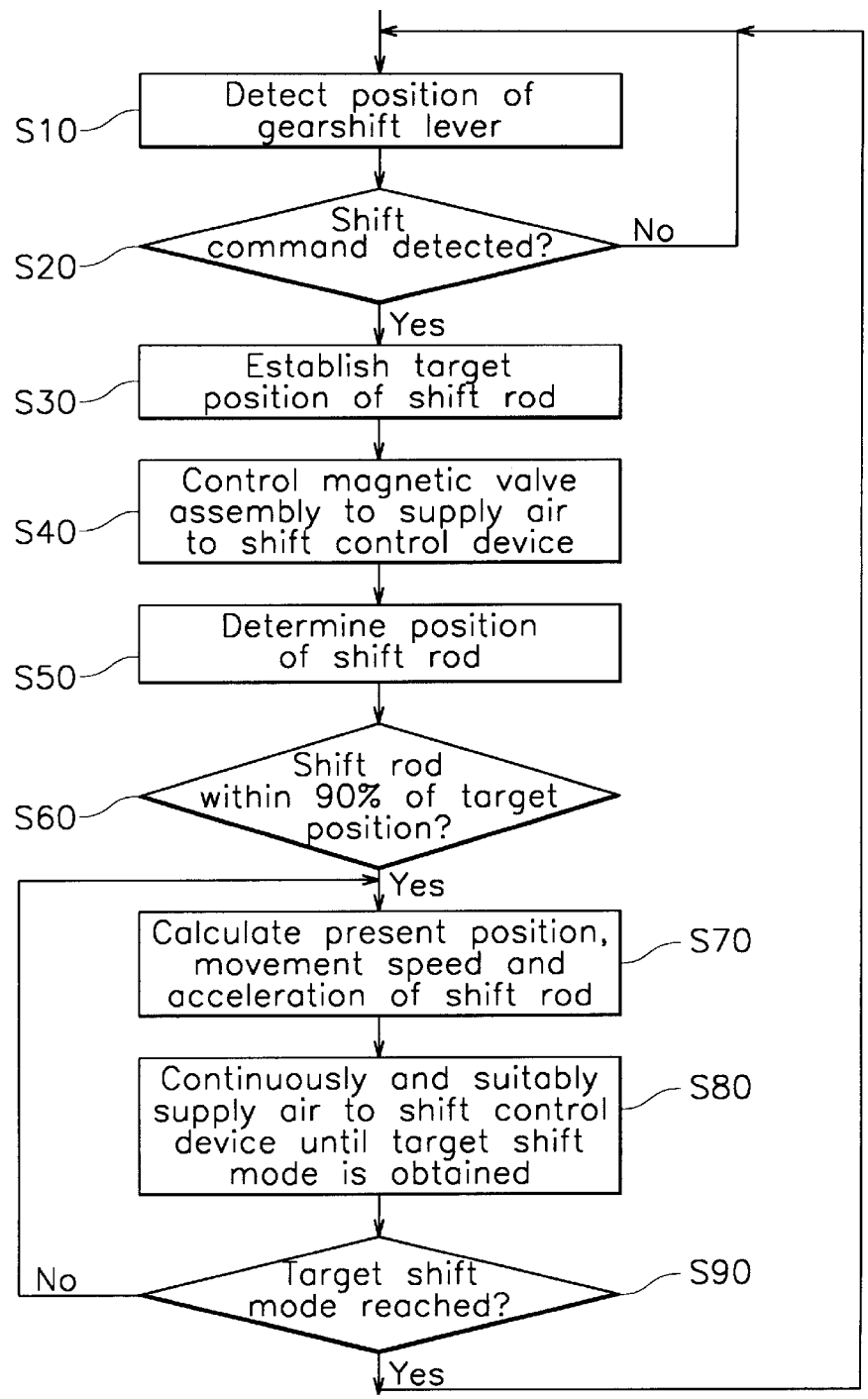
FIG. 3 is a flow chart of a method for controlling an automatic shift control device for an electronic pneumatic shift system according to a preferred embodiment of the present invention.

FIG. 3 shows a flow chart of a method for controlling an automatic shift control device for an electronic pneumatic shift system according to a preferred embodiment of the present invention.

First, after a position of a gearshift lever 4L is detected in step S10, it is determined if there is a shift command in step S20. If there is no shift command in step S20, the position of the gearshift lever 4L is continuously detected. However, if there is a shift command according to driver manipulation of the gearshift lever 4L in step S20, a target position for the shift rod 30 of the shift control device 12 is established in step S30.

Next, the magnetic valve assembly 10 is controlled to supply air to the cylinder MVA 26 and the cylinder MVB 28 of the shift control device 12 in step S40. Subsequently, the LVDT 54 determines the position of the shift rod 30 by the movement of the magnet 52 in step S50, the shift rod 30 changing position according to the air supplied to the cylinder MVA 26 and the cylinder MVB 28.

Following the above, it is determined, in step S60, if the shift rod 30 has come within 90% of the target position established in step S30. If the shift rod 30 has come within 90% of the target position in step S60, the present position, movement speed and acceleration of the shift rod 30 are calculated in step S70. However, if the shift rod 30 has not come within 90% of the target position, step S50 is repeated in which the LVDT 54 determines the position of the shift rod 30.

After step S70, air is continuously and suitably supplied to the cylinder MVA 26 and the cylinder MVB 28 such that the speed at which the shift rod 30 moves is regulated by control of the magnetic valve assembly 10 until a target shift mode has been obtained in step S80. Next, it is determined if the target shift mode has been reached in step S90. At this time, if the target shift mode has been reached in step S90, the process returns to step S10. However, if the target shift mode has not been reached in step S90, the process returns to step S70 in which the present position, movement speed and acceleration of the shift rod 30 are calculated in step S70.

In the automatic shift control device for an electronic pneumatic shift system and the method for controlling the same described above, shift shock is reduced by suitably controlling the shift rod until the target shift mode is obtained. As a result, overall ride comfort is improved and wear on the transmission is reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automatic shift control device for an electronic pneumatic shift system which detects a position of a gearshift lever through a lever position sensor, the lever position sensor outputting signals corresponding to the position of the gearshift lever to an electronic control unit such that the electronic control unit controls a magnetic valve assembly to supply and exhaust air to the shift control device to thereby control a transmission, the shift control device comprising:

a magnet disposed on one end a shift rod of the shift control device; and a linear variable distance transducer provided on an end of the shift control device corresponding to a position of the magnet, the linear variable distance transducer detecting a change in a magnetic field caused by a movement of the shift rod, and the linear variable distance transducer outputting signals corresponding to the change in the magnetic field to the electronic control unit.

2. A method for controlling an automatic shift control device for an electronic pneumatic shift system comprising the steps of:

>   detecting a position of a gearshift lever;
>
>   determining if there is a shift command;
>
>   establishing a target position for a shift rod of the shift control device if there is a shift command;
>
>   controlling a magnetic valve assembly to supply air to the shift control device;
>
>   detecting a position of the shift rod;
>
>   determining if the shift rod has come within 90% of the target position;
>
>   calculating a present position, movement speed and acceleration of the shift rod if the shift rod has come within 90% of the target position;
>
>   supplying air continuously and suitably to the shift control device until a target shift mode has been obtained; and
>
>   determining if the target shift mode has been reached.

3. The method of claim 2 wherein in the step of determining if there is a shift command, if there is no shift command, the position of the gearshift lever is continuously detected.

4. The method of claim 2 wherein in the step of determining if the shift rod has come within 90% of the target position, if the shift rod has not come within 90% of the target position, the LVDT determines the position of the shift rod.

5. The method of claim 2 wherein in the step of determining if the target shift mode has been reached, if the target shift mode has not been reached, the present position, movement speed and acceleration of the shift rod are calculated.

* * * * *